Dec. 24, 1940.  A. H. BACCI  2,226,332
BUILDING STRUCTURE
Filed Jan. 21, 1937   6 Sheets-Sheet 1
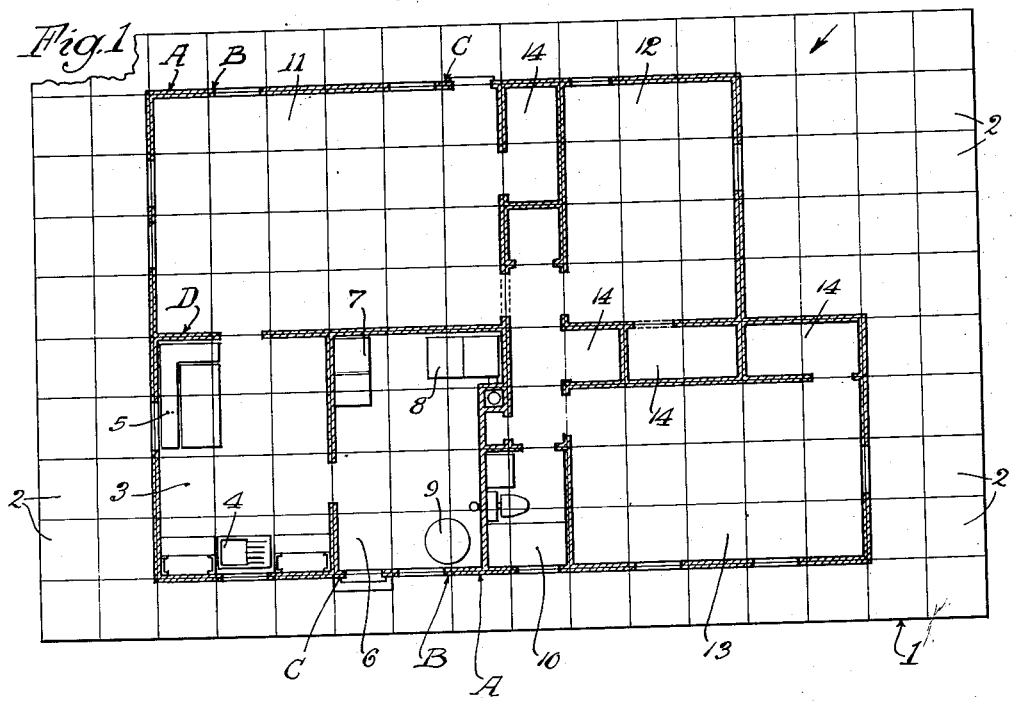
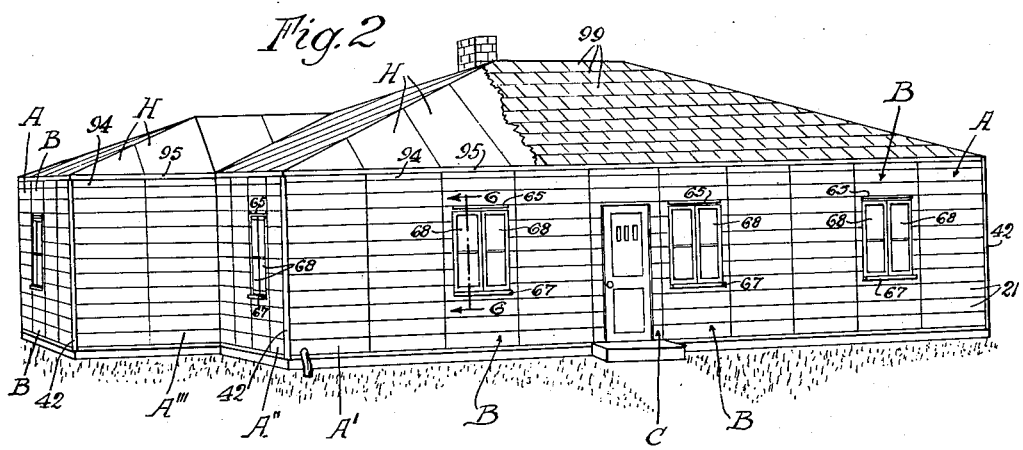
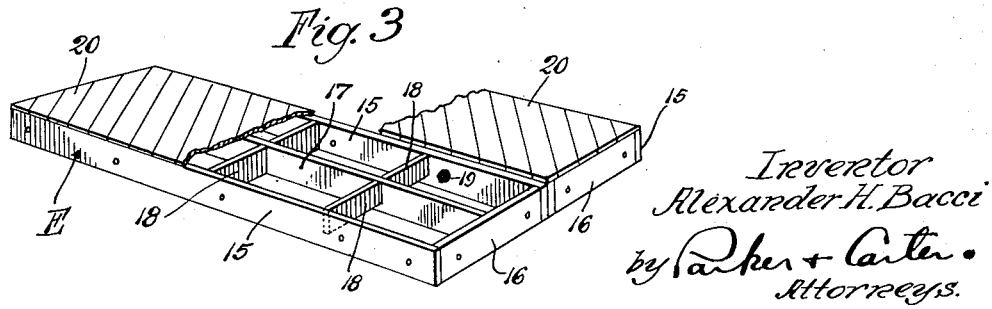
Inventor
Alexander H. Bacci
by Parker + Carter
Attorneys.

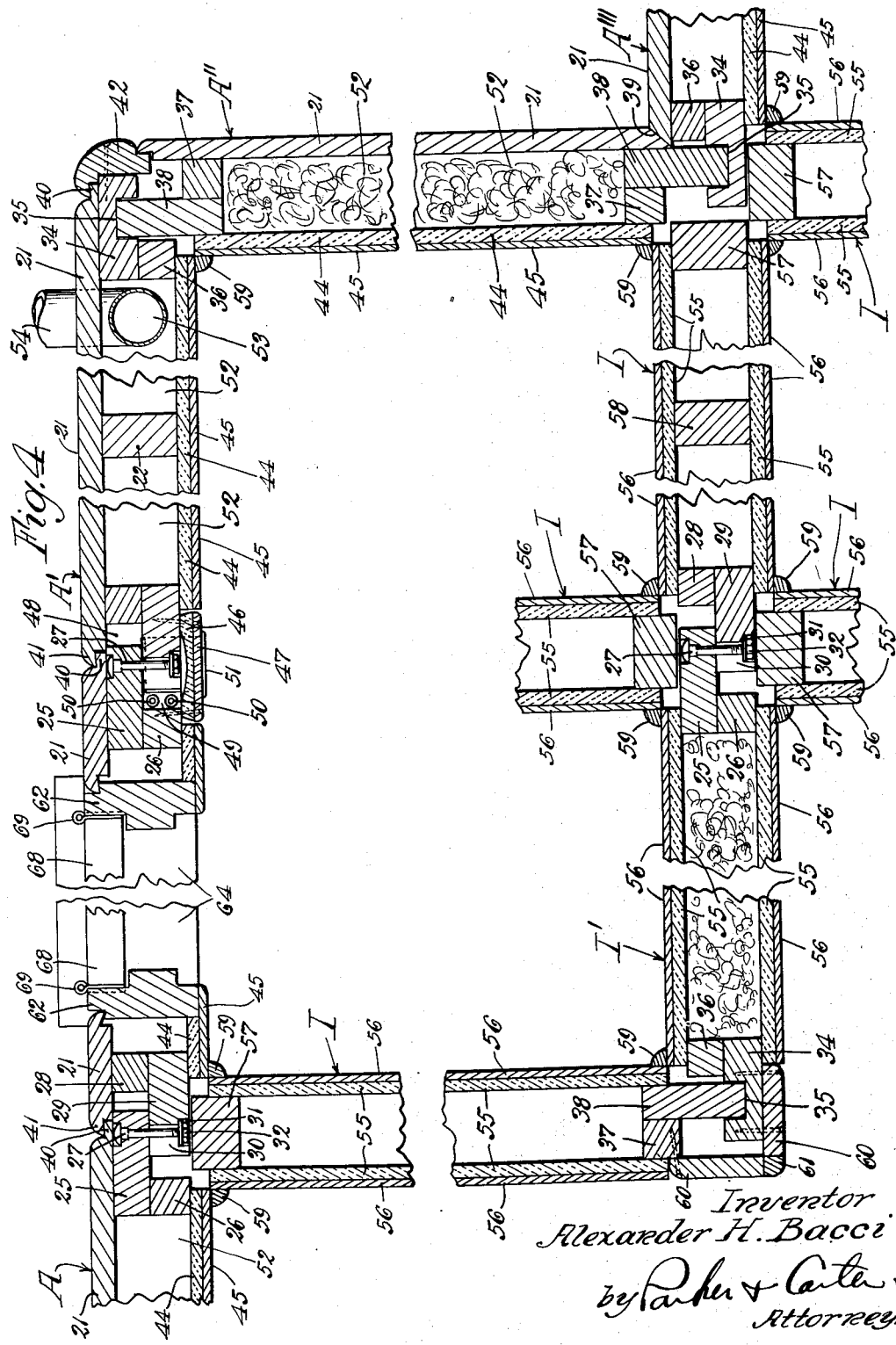

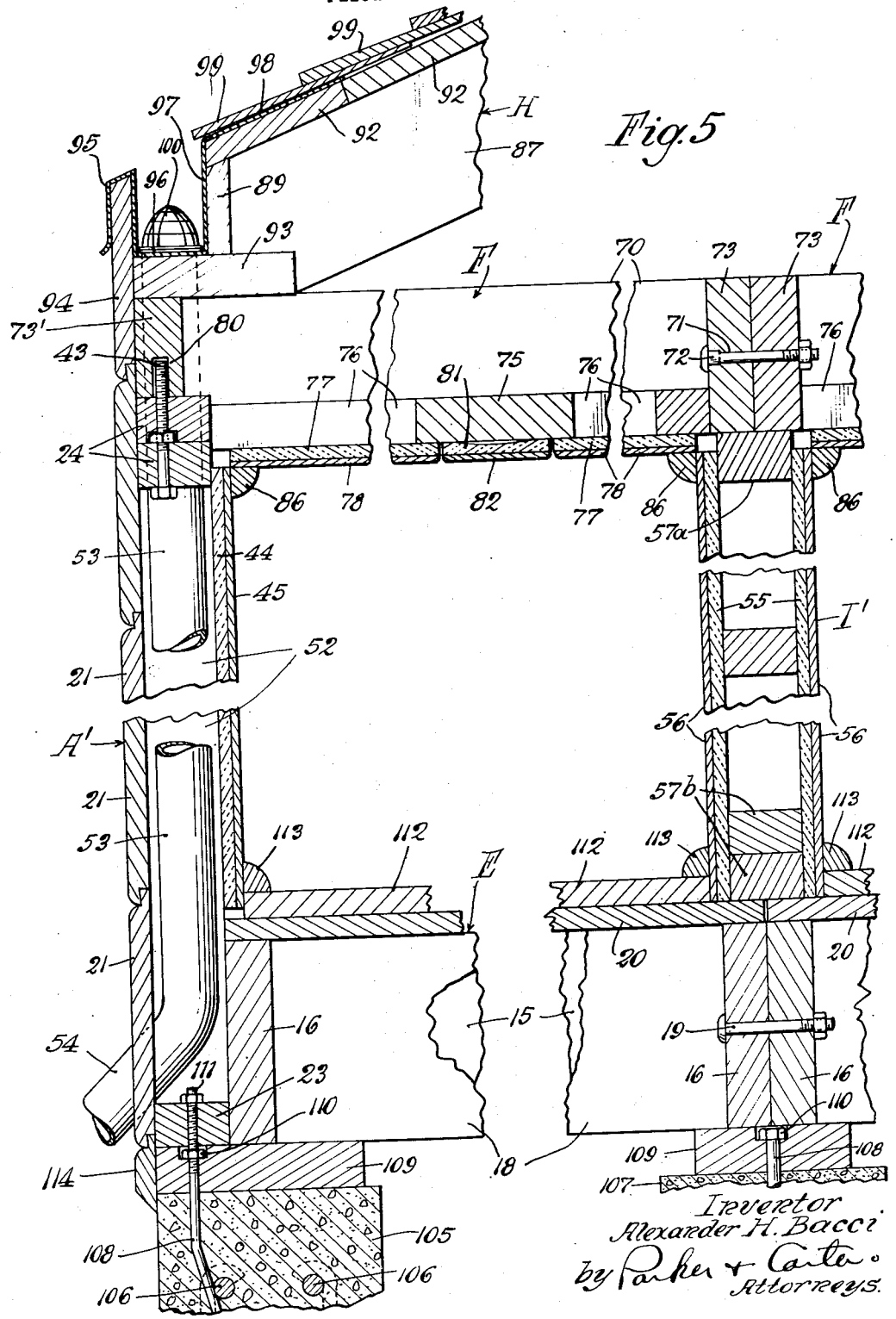

Dec. 24, 1940.  A. H. BACCI  2,226,332
BUILDING STRUCTURE
Filed Jan. 21, 1937  6 Sheets-Sheet 4
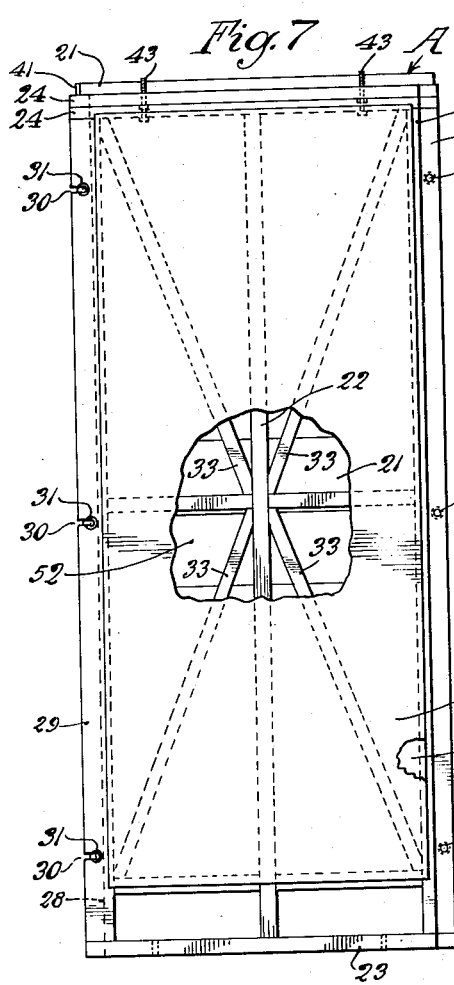
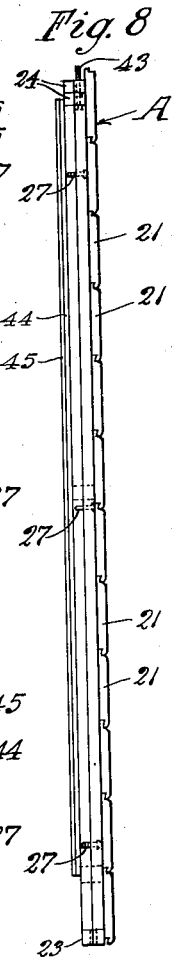
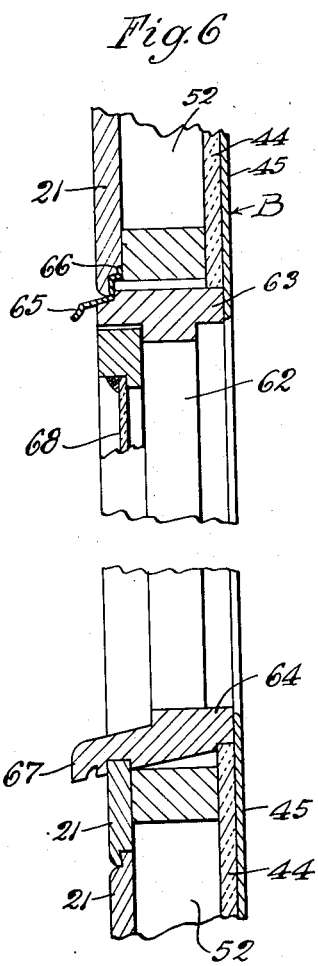
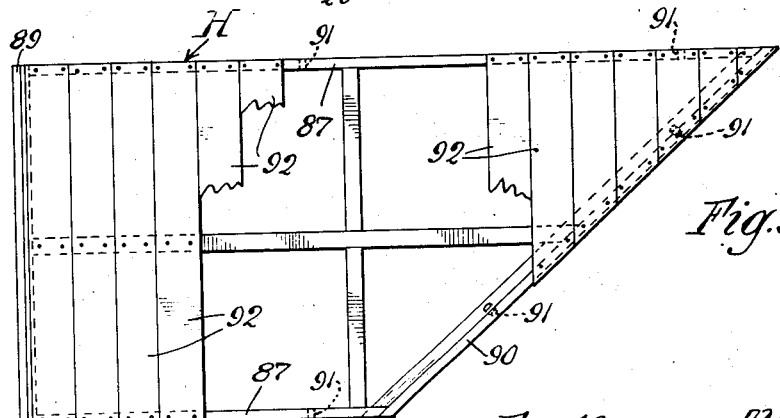
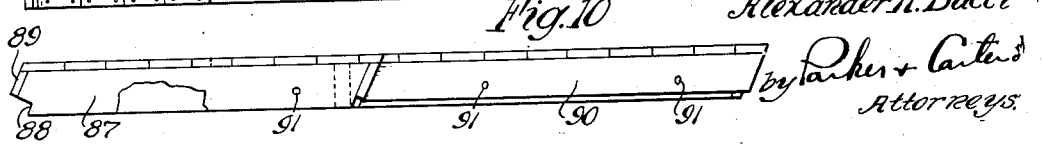
Inventor
Alexander H. Bacci
by Parker + Carter
Attorneys Dec. 24, 1940.  A. H. BACCI  2,226,332
BUILDING STRUCTURE
Filed Jan. 21, 1937  6 Sheets-Sheet 5

Inventor
Alexander H. Bacci
by Parker + Carter
Attorneys

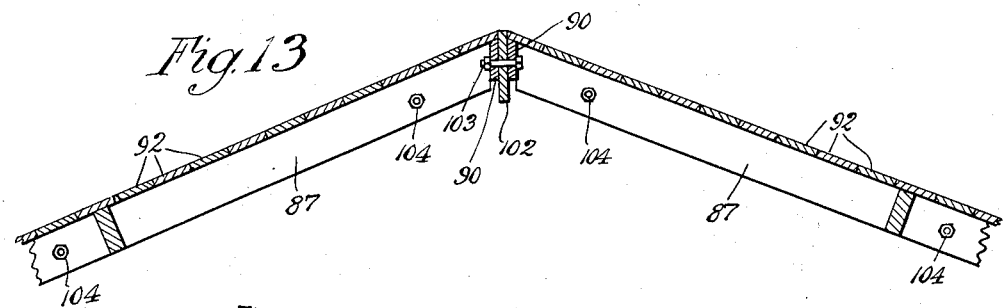
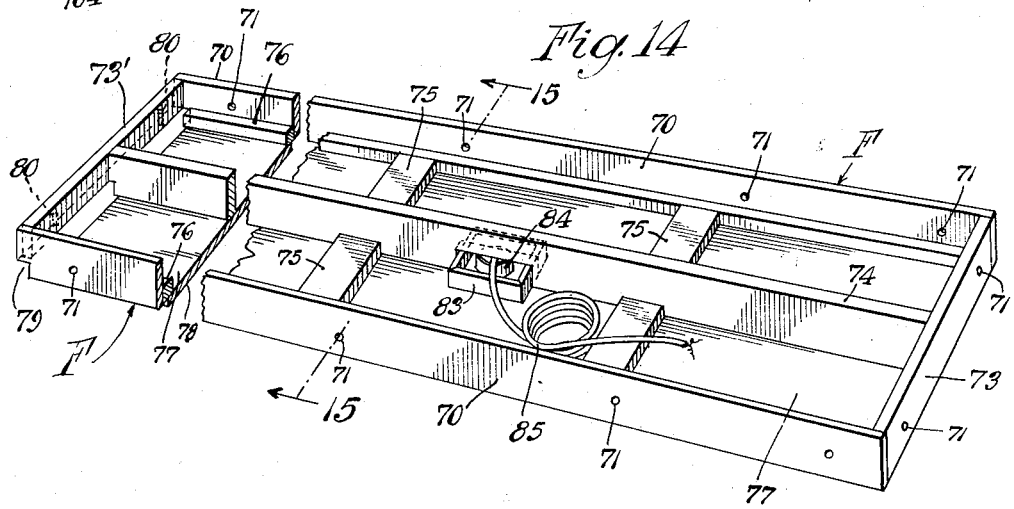
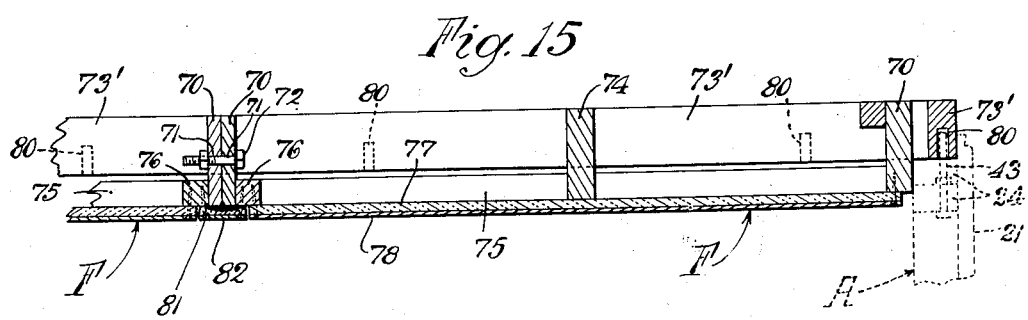

Patented Dec. 24, 1940

2,226,332

UNITED STATES PATENT OFFICE 2,226,332

BUILDING STRUCTURE

Alexander H. Bacci, Chicago, Ill.

Application January 21, 1937, Serial No. 121,470

1 Claim. (Cl. 20—2)

This invention relates to structures such as buildings and to means and processes for manufacturing them.

It has for one object to provide a number of structural units which may be assembled in various quantities and in a variety of ways to manufacture buildings of a variety of sizes and shapes formed of a relatively small number of such structural units. Another object is to produce structural units and to assemble them selectively to form buildings. Another object is to provide a structural unit suitable for assembly with a plurality of other similar units in a building. Another object is to provide a plurality of types of structural units so designed that they may be assembled to produce buildings of many sizes and shapes. Another object is to produce structural units.

Other objects will appear from time to time in the specification and claim.

The invention is illustrated more or less diagrammatically in the accompanying drawings, wherein—

Figure 1 is a plan view of a planning sheet upon which the plan for a simple housing structure has been illustrated;

Figure 2 is a perspective of one form of house built according to the plan of Figure 1, taken in the direction of the dart in that figure;

Figure 3 is a perspective with parts broken away and parts in section illustrating a plurality of floor units or channels;

Figure 4 is a generally horizontal sectional detail taken on an enlarged scale showing interior and exterior wall constructions and details;

Figure 5 is a generally vertical sectional detail taken on an enlarged scale showing a floor, wall, interior partition, ceiling and roof section;

Figure 6 is a vertical sectional detail taken on an enlarged scale at line 6—6 of Figure 2 illustrating a window panel;

Figure 7 is an inside elevational view of a wall panel with parts broken away;

Figure 8 is a side elevation of the wall panel of Figure 7;

Figure 9 is a plan view with parts broken away illustrating a roof panel;

Figure 10 is a side elevation of the panel of Figure 9 with parts broken away;

Figure 13 is a sectional view taken at line 13—13 of Figure 11 on an enlarged scale;

Figure 14 is a top perspective view of a ceiling panel with parts broken away and parts in section; and Figure 15 is a transverse vertical section taken on an enlarged scale at line 15—15 of Figure 14.

Like parts are designated by like characters throughout the specification and drawings.

Figure 11:
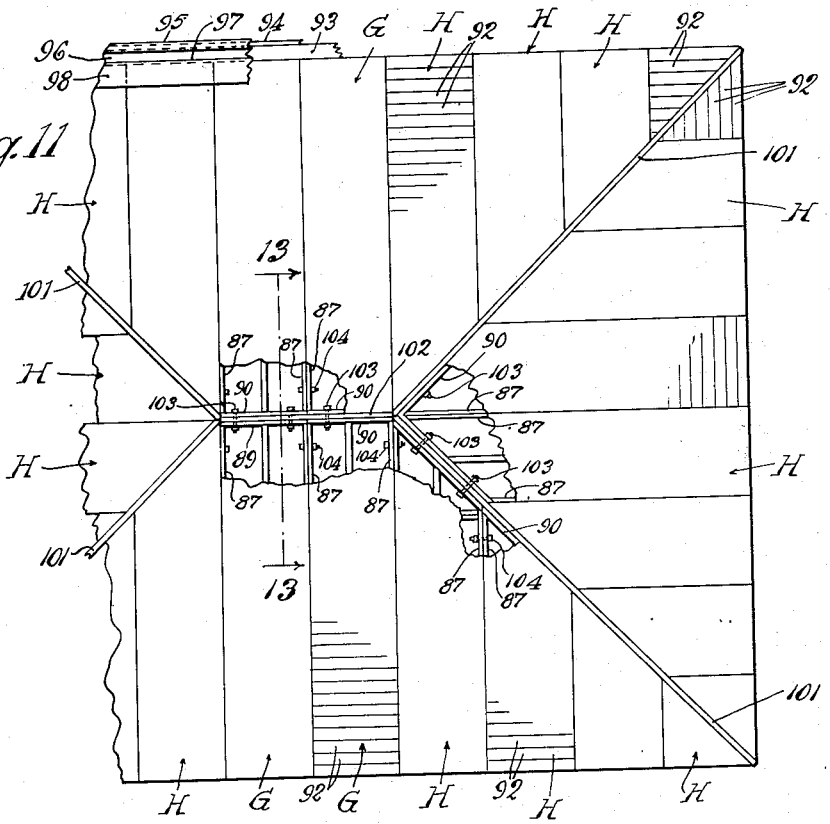
Figure 11 is a top view of a roof with parts broken away.

The numeral 1 indicates a planning sheet which is subdivided into squares 2. This sheet is usable for planning and illustration and the squares may be considered as illustrating a wall or partition panel. For many purposes it is convenient to make the wall and partition panels approximately 3 feet 8 inches in width and of any desired height. The squares 2 may thus be taken as indicating a square 3 feet 8 inches in diameter, although the invention is not limited to the use of panels of this size. As shown in Figure 1, 3 is a kitchen having a sink and other utilities 4. A shelf and other utilities 5 are also indicated. The kitchen 3 adjoins a utility room 6 which may have laundry tubs 7, a heater 8, a hot water heater 9 and other utilities. 10 is a bathroom having the usual fixtures. The kitchen 3, the utilities room 6 and the bathroom 10 constitute the utilities unit of the house and preferably they are arranged as shown in Figure 1 for houses of a wide variety of design. It is economical and simple, therefore, to have the utilities unit considered and treated as a unit even though it is itself built up of a plurality of individual wall, floor and ceiling panels, but the invention is not limited to this construction and the arrangement of the rooms and fixtures constituting the so-called "utilities" unit may be varied.

In the building shown in Figure 1, 11 may be considered a living room, 12 and 13 are bedrooms. Closets 14 are formed by suitable partitions.

In a manner which will be described more in detail below, the exterior walls of the house are built of three types of panels, the panel A being a plain wall panel without openings, such as is shown in greater detail in Figures 7 and 8. A plurality of these panels which are identical in size and shape is used in the exterior wall. A plurality of window panels B may be used and one or more door panels C. The interior partitions are built of inside wall panels D. There are thus in the main four types of panels used in building vertical walls and partitions, namely, the plain exterior wall panel A, the window panel B, the door panel C and the interior or partition panel D. These may all be of the same width and height, although the interior partition panels may differ in height from the exterior wall panels.

The floors are built up of a plurality of floor panels E. The ceilings are correspondingly built up of a plurality of ceiling panels F and the roof is built up of a plurality of rectangular roof panels G and a plurality of irregularly shaped roof panels H. These various panels will be described in greater detail below. In general, and in the particular form of the invention shown herewith, houses of a wide variety of sizes and shapes may be built from eight different panels which may be used in numbers and proportions depending on the size and design of the house. The utilities and fixtures, such as downspouts, wiring and pipe connections are positioned within the spaces formed in the various panels. In the majority of cases they are placed within the panels at the factory where they are made and only connection of the various units with each other is required on the site of building.

The individual panels are now described in detail. As noted above, Figures 3 and 5 illustrate a plurality of floor panels. Each of these is formed of longitudinal members 15 and transverse members 16. The length of each floor panel preferably varies from two to four squares and the width is normally that of one square. An internal longitudinal stiffening member 17 is used and a plurality of transverse stiffening members 18 may be used. These members always occur on the module line. The members 15 and 16 are perforated, as shown, to receive bolts or other fastening members 19 so that the floor sections may be bolted together and bolted to other parts of the building structure such as the outer wall panels, foundations and any other part which they may contact. Boarding 20 is laid preferably diagonally across each floor panel. This is generally sub-flooring, and the finished floor surface is laid after the floor panels are in place.

Figure 4 shows a plurality of exterior wall panels, a window panel and a number of interior panels. The exterior wall panels A, as shown in Figures 1, 7 and 8, comprise in each case an exterior portion which may be formed of siding or other boards 21. Each of these sections preferably includes a central vertical frame member 22, a bottom frame member 23 and top frame members 24, 24. At each side the panel members A have vertical frame members preferably formed of two parts. Thus as shown particularly in Figure 4, at one side there is the frame member 25 and a co-operating frame member 26 which is relatively smaller than the member 25. Positioned within the member 25 is a plurality of fastening means such for example as bolts 27 which may be carriage bolts or fastening means otherwise shaped to be held against rotation. On the opposite side the exterior side frame member 28 is attached to the interior side frame member 29. As shown the member 28 is preferably narrower than the member 29 and is provided with a plurality of notches 30 having depressions 31 in their inner ends to receive the nut 32 which may be secured on the bolt 27. Thus the side members of the panel frames are shaped to key together. On one side each frame preferably carries bolts and on the other side notches. The side frame arrangement is normally the same for the blank wall panels, for window panels and for door panels. A plurality of bracing frame members 33 may be used in the blank wall panels as shown in Figure 7.

A blank wall panel which is to be used for an exterior corner may have one or both side frames slightly modified from the construction just described. Such a wall panel is illustrated in Figure 4 and designated A'. Its inner edge or side frame construction is the same as that just described above. Its opposite edge has frame members similar in size and shape to the members 25 and 26. It is thus provided with an exterior frame member 34 which corresponds generally in size and shape to the member 25 but instead of carrying bolts 27 is grooved as at 35. The interior frame member 36 is the same in size and shape as the member 26.

An exterior blank wall panel designed to co-operate with the panel A' and to form an inner corner of the wall is shown in Figure 4 and is designated as A''. Its framing and siding or other exterior finish may be generally the same as that described in connection with the panels A and A'. Along one vertical edge it has an external frame member 37 and a member 38 which, as shown in Figure 4, fits into the groove 35 in the member 34 of the adjacent panel A'. Its opposite edge is correspondingly shaped except that the frame member 37 is on the inside and the member 38 is on the outside. The panel section A'' mates with a similar, but not exactly identical, panel section A'''. The side frame members of that panel include an exterior frame member 36 like the member 36 of the panel A' and an interior member 34 like the member 34 of the panel A' similarly grooved as at 35. The siding 21 of the panel sections A'' and A''' is preferably beveled as at 39, although it might be otherwise shaped. Except as shown at 39, the siding or other surface material of the wall sections is preferably shaped so that on one edge there is the internal flange 40 and on the other edge the external flange 41 so that the siding of adjoining sections overlap or interlock as shown generally in Figure 4. A special corner molding member 42 may be used as shown in the upper right hand corner of Figure 4 to finish the exterior corner of two wall panels meeting as shown in that figure.

In the top frame members of the various panels there are preferably mounted one or more pins, bolts or other fastening members 43. These serve to interlock with the ceiling and roof panels in a manner which will be described below.

The internal faces of the wall panels and of those portions of the window and door panels which are not occupied by the windows and doors proper carry as an integral part of their construction an interior finish which includes a sheet member 44 which may be of insulating material and a further sheet 45 which may be veneer, plywood or any other desirable material suitable for the finish of the interior of the room or building. As indicated generally and in Figure 4 particularly, this internal sheet material 44, 45 in each case terminates short of the edges of the frames so that a portion of the interior frames of each panel is left uncovered and exposed. It is in this exposed portion that the bolts and nuts or other attaching means are positioned and because they are exposed, the sections may be properly tightened together when assembled. Subsequent to assembly a finishing strip 46, 47, preferably comprising the same outer and inner sections as the members 44, 45, is secured in place, thus covering the otherwise exposed portions of the panel frames.

It will be noticed that in the various forms of panels there are at the joints one or more open spaces 48, 49. The purpose of these is to provide a space in which pipes, conduits and other utilities and fixtures may be positioned. Thus in Figure 4 electrical conduits 50 are located in one of the spaces 49. When that is done it may be desirable to mount in the finishing strip 46, 47, an outlet box 51 for electric light connection or fixture, and suitable connection will be made from the conduits 50 to the fixture or connection 51.

In addition to the spaces 48 and 49 left at the joints of panels there are also a number of spaces 52 left within the body of the panels. These are of a number of sizes and shapes varying with the details of the panels and depending upon whether or not the panel is for a blank wall, a window or a door, but in any event some such empty spaces exist and they may be filled with rock wool or any other desired insulating material, if desired, as shown, for example, in Figure 4, and those spaces 48 or 49 wihch are not needed for utilities and conduits may also be filled with insulation if desired.

A further provision which may be included in one or more panels is shown in one of the blank wall panels of Figures 4 and 5 and includes a downspout 53 which terminates in an elbow or laterally bent portion 54. This downspout is installed at the factory and thus forms an integral part of the panel.

Figures 4 and 5 illustrate in addition to the exterior wall construction the construction of inside walls or partitions. As shown these partitions are normally finished identically on both sides. They comprise thus sheet members 55, 55 which may be of insulating material, wall board, wood or of any other desired material upon the outside of each of which is mounted a sheet of finished material 56 such for example as wood, ply-wood, veneer or any other desired surface material. In general the edge frame construction of the interior wall panels may be generally in the same manner as that shown in connection with the exterior wall panels. Where two edges are to abut the construction is the same as that shown for the exterior walls; there is thus a frame member 25, and a narrower member 26, the member 25 carrying a carriage bolt 27. On the opposite edge there is a frame member 28 and a wider member 29 notched as at 30, which notch is enlarged as at 31 to receive a nut 32. Correspondingly, where the edge is to meet at right angles with another partition, as shown in the lower left hand corner of Figure 4, one side of one of the sections has a frame member 36, the other a wider frame member 34, notched as at 35. This edge of the partition section contacts a section which has an edge similar to that of the exterior wall section A″ and thus includes a frame member 37 and a wider member 38 which fits into the groove 35 in the member 34. On its opposite side or edge this partition panel which is to the left of Figure 4 has a straight sided frame member 57 which abuts against the joint of a pair of exterior wall panels and fits into the strip left bare by the termination of the members 44, 45. The partition panel will normally include an upper member 57a and a lower member 57b. As shown in Fig. 5 this latter is a double member. It might, however, be a single member. Thus although the interior wall or partition panels are of substantially the same construction, it is preferable to make certain modifications of their edge or edge frame construction depending upon the co-operation which they are to make with adjacent members. There may be an interior wall panel I having at one edge the simple frame member 57 and at the other edge the frame members 37 and 38 adapted to co-operate to meet at right angles with another panel. There may be one or more panels I′ having at one edge the frame members 34, 36 adapted to be secured at right angles to an adjacent panel and having at its other edge the frame members 25, 26 adapted to be secured to an abutting partition panel. It is to be noticed that whatever the details of the frame members on the edges of both interior and exterior wall panels, in general each frame member comprises a relatively narrow part and a relatively wider part. One of these parts may be grooved or one may be notched and a corresponding one provided with bolts or other fastening. What ever the details of these particular fastenings or of the particular mating arrangements, the frame members are preferably substantially the same in size and shape throughout with the exception that where a wall panel is to fit into the joint previously made by the securing together of two abutting panel members, it may be provided with a straight frame member 57.

The interior wall or partition panels will preferably have internal frame members 58 and may have other framing generally similar to that shown in detail in Figure 7 for the exterior wall panel and the space defined within the interior panel may be filled with insulating material if desired.

When partitions and panels are associated together to form a room or other enclosure, molding 59 may be placed in the corners to provide a suitable finish if desired. Where two partition panels meet to form an open corner, such as that shown in the lower left hand of Figure 4, closing strips 60, 60 may be used and a finishing molding 61 is applied at their juncture.

As above noted the door and window panels are of the same general outside dimensions as the plain or blank exterior wall panels. These have the same frame members, the same exterior siding 21, the same lining member 44 and surfacing member 45 and they differ thus from the blank wall panels only in the provision of openings and movable closures for those openings. A window panel is shown in horizontal section in Figure 4 and in vertical section in Figure 6. It has side frame members 62 and top and bottom frames 63, 64, respectively. In the particular form shown a deflector plate 65 is positioned above the upper frame 63 and is preferably shaped so that it extends inwardly and upwardly as at 66 within and behind the adjacent siding member 21. Correspondingly the lower frame member 64 extends outwardly and downwardly as at 67 to overlap the adjacent siding member 21. In the particular form shown the windows are of the so-called French window type and have one or more window sections 68, hinged at 69 and arranged to swing for opening or closing. A door panel differs only from the window panel in having a larger opening and usually in having a single door rather than the double window members.

Figure 12:
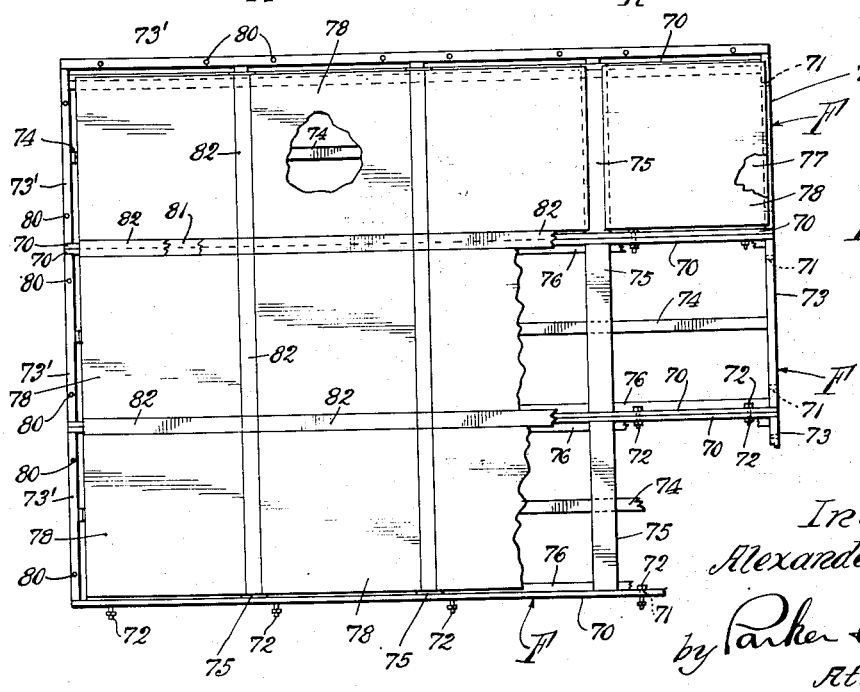
Figure 12 is a bottom plan view of a plurality of ceiling panels secured together as seen from below, with parts broken away.

As shown generally in Figures 14 and 15, the ceiling panels F comprise longitudinal frame members 70 perforated as at 71 to receive attaching members such as bolts 72 as shown in Figure 12. The ceiling panel includes also end members 73, 73′, an internal longitudinal member 74 and transverse frame members 75. Additional longitudinal frame members 76, 76 may be inserted if desired and to these or to the other frame members sheathing 77 is secured and a veneer or other finishing sheet 78 is secured upon the member 77. As in the case of the other panels the interior sheathing or finishing sheets terminate short of the edges of the frame members to permit the installation of utilities and to permit the mounting together of the sections and their association with the walls. As shown in Figure 14 particularly, one end of each ceiling panel is preferably indented or notched as at 79 to permit it to fit over and rest upon an exterior or interior wall panel, as shown particularly in Figure 5, and for that purpose the end frame member 73' is provided with holes or sockets 80 to fit upon the upper end of the bolts 43. Other socket or attaching members might be used but those shown form a convenient means for securing the ceiling panels to the wall structure. At their inner ends the ceiling sections are generally bolted end to end as shown in Figure 5 and at that end they rest upon the top frame member of an interior partition. Since they are fixed to the walls they do not as a rule need to be fixed to the interior partition but rest upon it, the attachment to the walls serving to position and retain the ceiling panel.

As a matter of ornamental appearance almost any desired surface treatment may be applied to the ceiling panels. The sheets 77, 78 may be continuous for the length of a panel or they may be discontinuous. Since as above noted the panel generally has a length of four squares these sheet materials may be divided into four squares and they are so shown in Figure 12. In that case transverse and longitudinal filler strips 81, 82 may be used to fill in the spaces between the sheets 77, 78 and to give the ceiling the ornamental design shown for example in Figure 12. Obviously many other surface treatments and designs may be used and the one shown is only illustrative of one form.

Since some form of lighting fixture is generally desirable in the ceiling, one or more of the ceiling panels is equipped with a box 83, preferably supported upon the central frame member 74. This box includes an outlet or junction box 84 to which the fixture or a mounting for the fixture is secured. A conduit 85 is secured to the box and all these arrangements are made at the factory, the conduit is provided in suitable length to reach utility outlets in the wall of the house and is rolled up as shown in Figure 14 and in that manner shipped out for installation in the house. When ceiling sections have been installed moldings 86 may, if desired, be placed in position to finish the junction of wall and ceiling.

The roof sections are shown in detail in Figures 5, 9, 10, 11 and 13. In general each roof section comprises side frame members 87, which may be of the same length for a rectangular section G or will be of different lengths for an irregularly shaped section H. At one end the side frame members of the roof section are notched as at 88 to fit against a wall and at the same end they are joined by an end frame member 89. In the case of the rectangular sections there is also an end frame member 89 at the other end but in the case of the irregularly shaped panels there is a diagonal frame member 90. The side and upper end frame members are preferably perforated as at 91 to receive attaching means which will usually be bolts by means of which the roof frames are bolted to each other or to the rough framework. Whatever the particular shape of the roof panel, it is provided on its top with boards 92. One edge or end rests against a board 93. Such boards are secured upon the top of the wall and ceil structure, being usually nailed in place after the wall and ceiling panels have been assembled as shown in Figure 5. After these boards 93 have been secured in place a finishing siding 94 is secured in place. Gutters are preferably made in sections and are installed, resting partly over the siding 94, partly on the boards 93 and partly on the ends of the ceiling sections. Thus a portion 95 of the gutter embraces the upper edge of the siding 94, another portion 96 forms the gutter proper. A portion 97 overlies the roof panel frame 89 and a portion 98 overlies some of the planking 92. When the roof as a whole is in place shingles 99 or other desired final roof covering is installed and this overlies the portion 98 of the gutter structure. When the gutter is in place a connection is made between it and the downspout 53 and a screen or other suitable protection 100 may be applied over the upper end of the downspout.

It is preferable in the erection of the roof to install frame members before the roof sections or panels are put in place. The shape and arrangement of these frame members depends upon the plan of the house and the plan of the roof. There will ordinarily be diagonal or inclined frame members 101, attached to a horizontal or ridge member 102. The roof sections, where they meet the frame members are attached through them to the corresponding roof panels on the opposite side by bolts 103. Where the roof panels join each other they are similarly joined by bolts 104.

When a house is to be erected its details are preferably worked out on a planning sheet such as that shown in Figure 1. When the design has been decided upon the number of various wall, partition, floor, ceiling and roof panels necessary to complete the house can be readily determined and these panels are then withdrawn from stock and shipped to the point where the house is to be erected. A foundation is made. It may, of course, include a basement or may not. The foundation is indicated diagrammatically in Figure 5 and includes members 105 having reinforcing 106 and other members 107. Threaded members 108 are secured in the foundation and extend outwardly. Members 109 are then placed upon the foundations and secured thereto by engagement with the threaded members 108 and by means of nuts 110 or otherwise. The exterior wall sections are bolted at their lower edges to one or more members 108, as shown at 111. After the exterior wall sections are in place the floor panels are placed in position upon the members 109. Final floor members such as boards or other surface treatment 112 may be put in place on the floor panels and moldings 113 are added if desired. The ceiling and roof sections are put in place upon the exterior and interior walls and the structure is completed. A finishing member 114 may be added below the siding 21 of the outer wall members. This member normally extends when used from the bottom member 23 of the outer wall section to and over the member 109 and thus covers and finishes this portion of the exterior of the house.

It is to be understood that the order of the various steps in the erection of the building may be varied and the invention is not limited to any fixed order of procedure. As a matter of convenient procedure in erecting a building according to this invention, the foundation is made. The members 109 are secured in position, some floor sections are placed, usually enough to serve for a corner room. Then the outer wall sections are placed, secured together, the inner partitions to form that room are placed and secured in position. The ceiling sections are then installed. As soon as enough of this structure has been put up to support a part of the roof framing, as much of the latter is installed as is possible, and then roof sections are put in place. The building continues thus by the erection step by step of floor sections, wall sections, partition sections, ceiling sections and roof sections. In this manner of progressive building each unit or each group of units serve to support adjacent units and to provide stiffness as early as possible in the building.

It will, of course, be possible by the use of additional bracing elements, first to erect all of the exterior wall elements, then put in partitions, then ceilings and roof, but experience has shown that this ordinarily requires more labor and more material in the way of temporary framing or supporting parts than would otherwise be necessary and these extra or temporary parts must be removed and are of no permanent value. Consequently in the normal operation it is preferable to build the structure step by step so that as building progresses each unit or collection of units that has been built furnishes a support for succeeding units or groups of units and this manner of construction also makes misalignment less likely. While the invention is not limited to this particular procedure, experience has shown that ordinarily it is to be preferred.

I claim:

In a building construction, a plurality of preformed wall panels, interior and exterior sheathing thereon, interlocking members projecting from opposed edges of the panels, the sheathing terminating short of said interlocking members, separate sheathing elements adapted to interlock with and be separately attached to the interlocking panel members and to be in alignment with the exterior sheathing, holding means exposed on the inner side of the panel associated with the interlocking means and a separately attached interior sheathing covering said holding means.

ALEXANDER H. BACCI.